(12) United States Patent
Takaki et al.

(10) Patent No.: US 10,814,841 B2
(45) Date of Patent: Oct. 27, 2020

(54) DRIVING SUPPORT CONTROL APPARATUS AND DRIVING SUPPORT CONTROL METHOD OF CONTROLLING VEHICLE BRAKING

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ryo Takaki, Kariya (JP); Masayasu Tanase, Toyota (JP); Wataru Ike, Toyota (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 198 days.

(21) Appl. No.: 16/064,712

(22) PCT Filed: Dec. 20, 2016

(86) PCT No.: PCT/JP2016/087884
§ 371 (c)(1),
(2) Date: Jun. 21, 2018

(87) PCT Pub. No.: WO2017/110777
PCT Pub. Date: Jun. 29, 2017

(65) Prior Publication Data
US 2019/0001938 A1     Jan. 3, 2019

(30) Foreign Application Priority Data

Dec. 25, 2015  (JP) ................. 2015-254469

(51) Int. Cl.
*B60T 8/171* (2006.01)
*B60T 7/22* (2006.01)
(Continued)

(52) U.S. Cl.
CPC ........ *B60T 7/22* (2013.01); *B60T 7/12* (2013.01); *B60T 8/17* (2013.01); *B60T 8/171* (2013.01);
(Continued)

(58) Field of Classification Search
None
See application file for complete search history.

(56) References Cited

U.S. PATENT DOCUMENTS 6,591,180 B1 * 7/2003 Steiner .................. B60W 30/16
701/96
8,731,795 B2 * 5/2014 Frashure ................ B60T 7/042
180/244

(Continued)

FOREIGN PATENT DOCUMENTS

JP  2001-113979  4/2001
JP  2002-267751  9/2002

*Primary Examiner* — Jess Whittington
(74) *Attorney, Agent, or Firm* — Maschoff Brennan (57) ABSTRACT

A controller calculates absolute velocity of an object based on acquired own vehicle velocity and acquired relative velocity of the object with respect to an own vehicle. The controller determines a relative movement state of the object in a direction of movement of the own vehicle based on the calculated absolute velocity of the object. The controller changes a threshold for the absolute velocity of the object to be used for determination of the relative movement state of the object while the automatic brake is actuated.

7 Claims, 9 Drawing Sheets

(51) Int. Cl.
*B60T 8/172* (2006.01)
*B60T 7/12* (2006.01)
*B60T 8/17* (2006.01)

(52) U.S. Cl.
CPC ......... *B60T 8/172* (2013.01); *B60T 2201/022* (2013.01); *B60T 2250/04* (2013.01)

(56) References Cited

U.S. PATENT DOCUMENTS

| | | | |
|---|---|---|---|
| 8,972,147 B2* | 3/2015 | Taneyhill | B60K 31/0066 701/96 |
| 2015/0239472 A1* | 8/2015 | Sudou | B60W 40/04 702/96 |

* cited by examiner

[RELATIVE VELOCITY OF OBJECT AND OWN VEHICLE VELOCITY]

[ABSOLUTE VELOCITY OF OBJECT]

[RELATIVE MOVEMENT STATE OF OBJECT]

[BRAKE REQUEST FLAG]

FIG. 8

[VEHICLE]

[PEDESTRIAN]

[BICYCLE]

DRIVING SUPPORT CONTROL APPARATUS AND DRIVING SUPPORT CONTROL METHOD OF CONTROLLING VEHICLE BRAKING

CROSS-REFERENCE TO RELATED APPLICATION

This application is based on and claims the benefit of priority from earlier Japanese Patent Application No. 2015-254469 filed on Dec. 25, 2015, the disclosures of which is incorporated herein by reference.

TECHNICAL FIELD

The present disclosure relates to a driving support control technique of controlling an automatic brake of an own vehicle depending on the velocity of an object.

BACKGROUND ART

As a driving support control of a vehicle, there is a technique of actuating an automatic brake of an own vehicle based on a predetermined actuation condition (see, for example, PTL 1). Further, as a technique of avoiding a collision with an object present in front of an own vehicle (for example, a preceding vehicle) during traveling or alleviating damage from a collision, there is the following collision avoidance control. In the collision avoidance control, whether an object is moving in the same direction as a direction of movement of the own vehicle, is stationary, or is moving in an opposite direction is determined based on the absolute velocity of the object. In the collision avoidance control, an alarm, an automatic brake, or the like, is actuated based on determination results.

As an example, a preceding vehicle which is moving in the same direction as the direction of movement of the own vehicle or a stationary vehicle is targeted to be subjected to collision avoidance control, and an oncoming vehicle which is moving in an opposite direction is not targeted to be subjected to collision avoidance control. The absolute velocity of the object to be used for collision avoidance control is calculated using, for example, own vehicle velocity calculated based on the rotation of wheels and relative velocity of the own vehicle with respect to the object acquired from a radar apparatus, or the like.

CITATION LIST

Patent Literature

[PTL 1] JP 2001-113979 A

SUMMARY OF THE INVENTION

Technical Problem

It can be considered that calculation accuracy of absolute velocity of an object may temporarily decrease for some reason. For example, it can be considered that, in the case where own vehicle velocity temporarily decreases and erroneous detection occurs due to the wheels being locked while an automatic brake is actuated, calculation accuracy of the absolute velocity of the object decreases as a result. Further, it can be considered that, in the case where erroneous detection of the relative velocity of an own vehicle with respect to the object occurs due to delay of filter processing at the radar apparatus, or the like, calculation accuracy of the absolute velocity of the object decreases as a result. In such cases, there is a risk that reliability of a driving support control technique lowers due to decrease in calculation accuracy of the absolute velocity of the object.

The present disclosure is directed to providing a driving support control apparatus and a driving support control method for preventing erroneous operation of an apparatus due to erroneous detection of absolute velocity of an object and performing appropriate control of an automatic brake.

Solution to Problem

One aspect of a technique of the present disclosure is a driving support control apparatus applied to a vehicle system actuating an automatic brake using a brake apparatus on based on a predetermined actuation condition and performing collision avoidance control relative to an object present in front of an own vehicle, the driving support control apparatus includes an own vehicle velocity acquiring unit, a relative velocity acquiring unit, a state determining unit, a brake detecting unit, and a threshold changing unit. The own vehicle velocity acquiring unit is configured to acquire own vehicle velocity. The relative velocity acquiring unit is configured to acquire relative velocity of the object with respect to the own vehicle, an object velocity calculating unit configured to calculate absolute velocity of the object based on the acquired own vehicle velocity and the acquired relative velocity. The state determining unit is configured to determine a relative movement state of the object in a direction of movement of the own vehicle based on the calculated absolute velocity. The brake detecting unit is configured to detect a state where the automatic brake is actuated. The threshold changing unit is configured to change a threshold for the absolute velocity to be used for determination of the relative movement state by the state determining unit while the automatic brake is actuated.

As described above, the driving support control apparatus of the present disclosure changes the threshold for the absolute velocity to be used for determination of the relative movement state of the object after actuation of the automatic brake is started (after the automatic brake is actuated). Therefore, in the driving support control apparatus, if the absolute velocity of the object is erroneously detected (in the case where calculation accuracy would otherwise decrease), the state determining unit is less likely to erroneously determine the relative movement state. As a result, in the driving support control apparatus, it is possible to appropriately actuate the automatic brake, so that the reliability of driving support control is improved.

DESCRIPTION OF EMBODIMENTS

With reference to the drawings, embodiments of a driving support control apparatus which is one aspect of a technique of the present disclosure will be described below. The components identical with or similar to those in the embodiments described below are given the same reference signs for the sake of omitting unnecessary explanation.

First Embodiment

Figure 1:
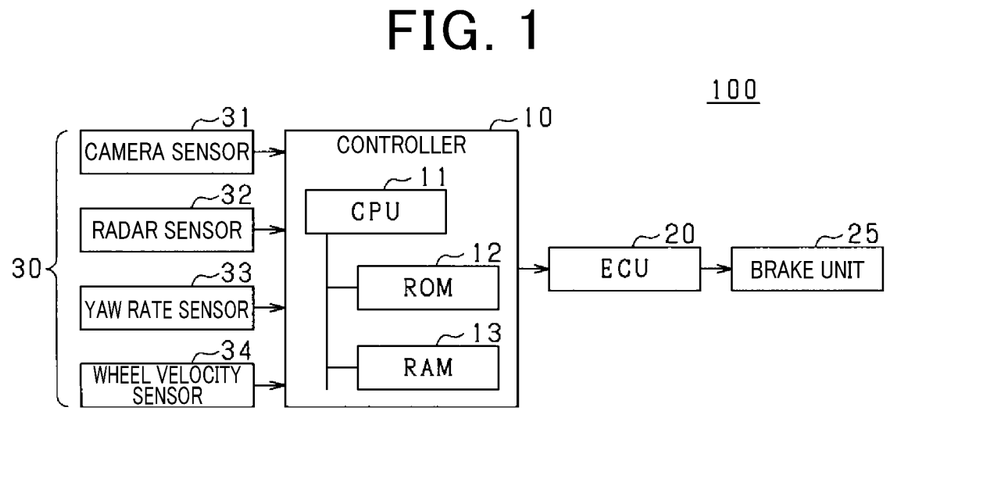
FIG. 1 is a diagram illustrating a pre-crash safety system to which a driving support control apparatus is applied.

FIG. 1 illustrates a configuration example of a pre-crash safety system (hereinafter, referred to as a "PCS") 100 to which a driving support control apparatus (driving support control method) of the present embodiment is applied. The PCS 100 is one vehicle system mounted on a vehicle. The PCS 100, for example, detects an object located in front of a vehicle, and, in the case where there is a risk that the vehicle may collide with the detected object, performs collision avoidance operation using an automatic brake or operation for alleviating damage from a collision. In the following description, a vehicle on which the PCS 100 is mounted will be described as an own vehicle Cs, and an object to be detected by the PCS 100 will be described as an object Ob.

As illustrated in FIG. 1, the PCS 100 includes a controller 10, a sensor 30, an ECU 20, and a brake unit 25. In the present embodiment, the driving support control apparatus corresponds to the controller 10, and the driving support control method is implemented by processing to be executed by the controller 10 (function of the controller 10).

The sensor 30, which is connected to the controller 10, outputs detection results with respect to the object Ob and the own vehicle Cs to the controller 10. FIG. 1 illustrates an example where a camera sensor 31, a radar sensor 32, a yaw rate sensor 33, a wheel velocity sensor 34, or the like, are provided as the sensor 30.

The camera sensor 31 is configured as a stereo camera which acquires a captured image of the object Ob. In the present embodiment, the camera sensor 31 recognizes a shape of the object Ob such as a pedestrian, an obstacle on the road and other vehicle based on the captured image and outputs the shape as detection results.

The radar sensor 32 is configured as a well-known sensor which transmits/receives a predetermined frequency signal and detects the object Ob. In the present embodiment, the radar sensor 32, for example, transmits a predetermined frequency signal to the object Ob and receives a signal reflected from the object Ob. The radar sensor 32 acquires relative velocity Vr and relative distance Dr of the object Ob with respect to the own vehicle Cs based on received waves (reflected waves) and outputs the relative velocity Vr and the relative distance Dr as a detection result.

The yaw rate sensor 33 is configured as a well-known sensor which detects turning angular velocity of the vehicle and outputs detection results.

The wheel velocity sensor 34 is configured as a well-known sensor which detects rotation velocity of at least one wheel of the own vehicle Cs. In the present embodiment, the wheel velocity sensor 34 is, for example, configured with a non-contact type sensor disposed at each of the wheels of the own vehicle Cs, detects change of a magnetic field caused by a rotor which rotates with each wheel and outputs detection results.

Note that the sensor 30 outputs the detection results to the controller 10 for each predetermined period set in advance.

The controller 10 is configured as a well-known computer including a CPU 11, a ROM 12, a RAM 13, or the like. The controller 10 performs collision avoidance processing (collision avoidance control function) which will be described later based on the detection results, or the like, by the sensor 30 by, for example, executing a program stored in the ROM 12.

The ECU 20 is connected to the controller 10 and the brake unit 25. The ECU 20 is mainly configured with a microcomputer, and performs, for example, processing of controlling the brake unit 25 by executing a program stored in the ROM. In a case of controlling the brake unit 25, the ECU 20 causes the brake unit 25 to operate in accordance with output from the controller 10.

The brake unit 25, which functions as a brake apparatus, actuates an automatic brake (braking control by driving support) of the own vehicle Cs based on control by the ECU 20. The brake unit 25 includes, for example, a master cylinder, a wheel cylinder and an ABS actuator. The wheel cylinder provides braking force to wheels. The ABS actuator adjusts distribution of pressure (hydraulic pressure) from the master cylinder to the wheel cylinder. The ABS actuator, which is connected to the ECU 20, adjusts hydraulic pressure from the master cylinder to the wheel cylinder by control from the ECU 20. By this means, the ABS actuator adjusts a braking amount with respect to the wheels.

Next, with reference to FIG. 2, the collision avoidance processing to be performed by the PCS 100 will be described. The collision avoidance processing of the present embodiment is repeatedly executed by the controller 10 at a predetermined period (for example, approximately 50 milliseconds) set in advance. In the following description, collision avoidance processing which is currently being executed by the controller 10 will be described as "current processing", and processing executed prior to the current processing will be described as "previous processing".

Figure 2:
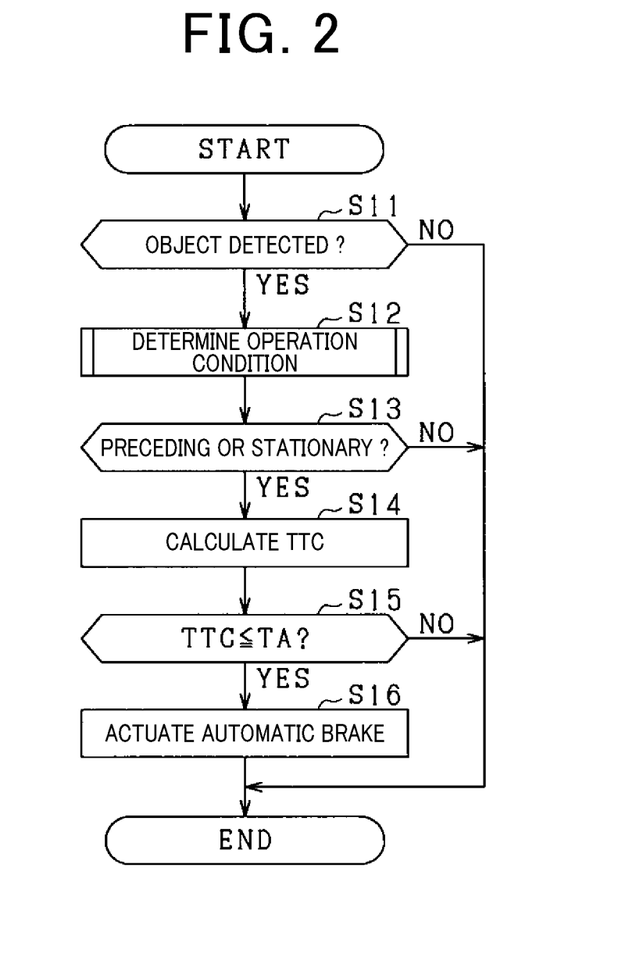
FIG. 2 is a flowchart illustrating collision avoidance processing performed by the pre-crash safety system.

As illustrated in FIG. 2, the controller 10 first determines whether an object Ob is detected (step S11). An object present in front of the own vehicle Cs is detected by the camera sensor 31 or the radar sensor 32 mounted on the own vehicle Cs. By determining whether location information of the object Ob, thus detected is acquired, the controller 10 determines whether the object Ob is detected.

In the case where the controller 10 determines that the object Ob is detected (YES at step S1), the controller 10 determines an operation condition for actuating the automatic brake (step S12). In the processing of determining the operation condition in step S12, actuation of the automatic brake is determined (whether the automatic brake has been actuated is determined) in accordance with a relative movement state of the object Ob in a direction of movement of the own vehicle Cs. In the case where the controller 10 determines that the object Ob is not detected (NO at step S11), the present processing is terminated.

Figure 3A:
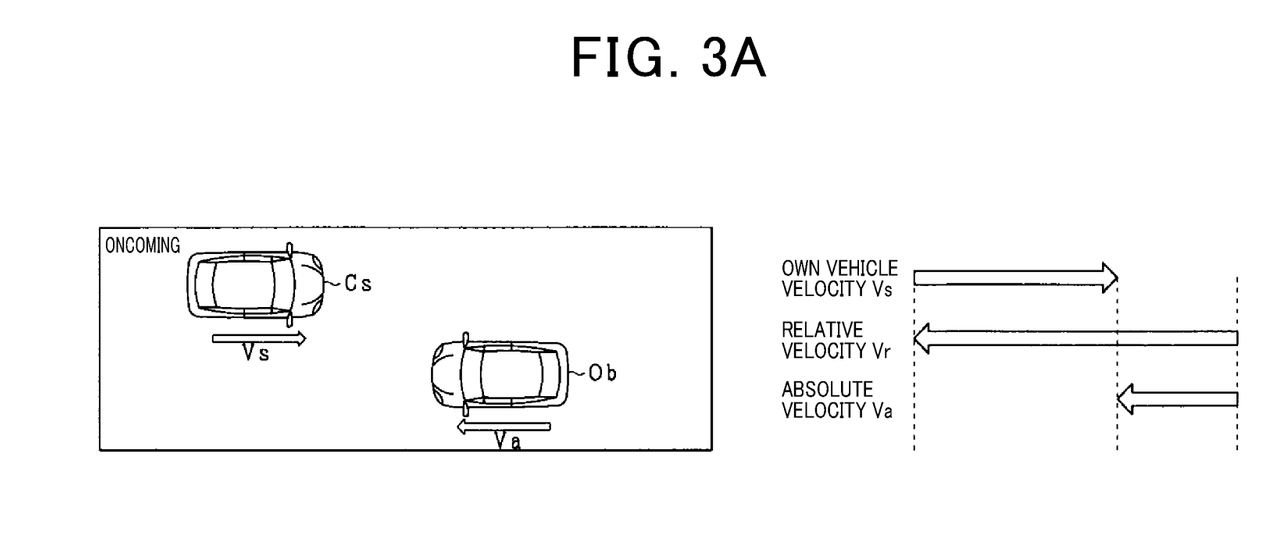
FIG. 3A is a diagram illustrating a relative movement state of an object in an oncoming state.
Figure 3B:
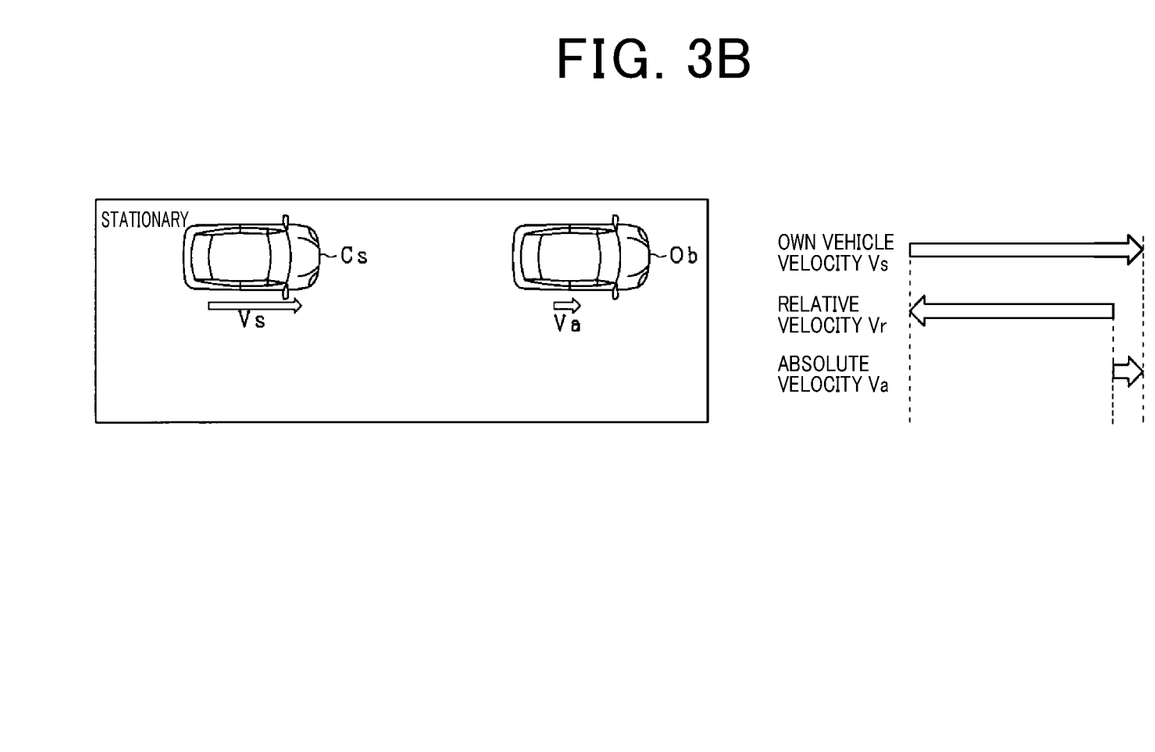
FIG. 3B is a diagram illustrating the relative movement state of the object in a stationary state.
Figure 3C:
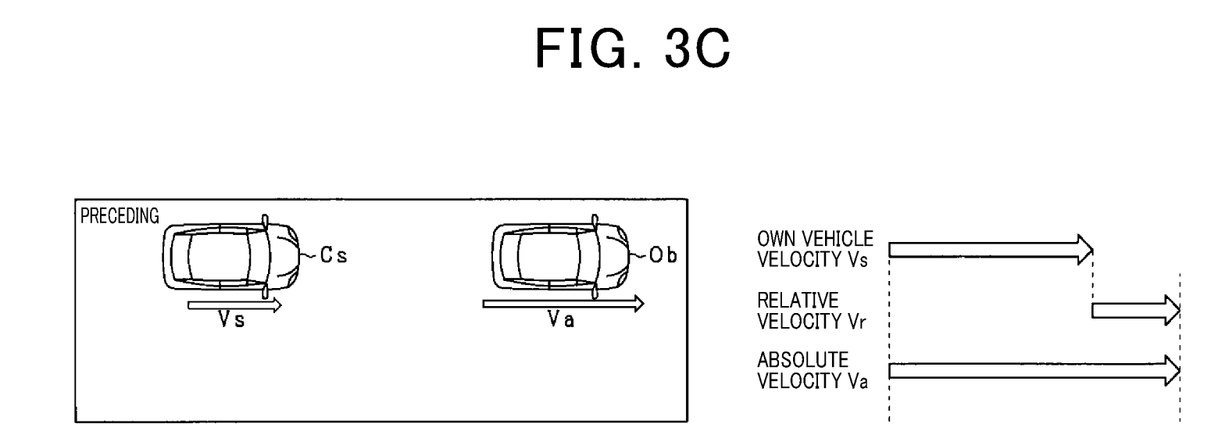
FIG. 3C is a diagram illustrating the relative movement state of the object in a preceding state.

FIG. 3A, FIG. 3B and FIG. 3C are diagrams illustrating the relative movement states of the object Ob. In the present embodiment, the controller 10 determines the relative movement state of the object Ob as one of "oncoming", "stationary" and "preceding" with respect to the own vehicle Cs using absolute velocity Va of the object Ob. As illustrated in FIG. 3A, oncoming is a state where a direction of movement of the object Ob is opposite to the direction of movement of the own vehicle Cs (signs of velocity are inverse) and the absolute velocity Va of the object Ob is equal to or higher than predetermined velocity (determination threshold Td1). As illustrated in FIG. 3B, stationary is a state where the direction of movement of the object Ob is the same as or opposite to the direction of movement of the own vehicle Cs and the absolute velocity Va of the object Ob is lower than predetermined velocity (determination thresholds Td1, Td2). Note that the determination thresholds Td1, Td2 have relationship such that Td1 is greater than Td2 (Td1>Td2). As illustrated in FIG. 3C, preceding is a state where the direction of movement of the object Ob is the same as the direction of movement of the own vehicle Cs and the absolute velocity of the object Ob is equal to or higher than the predetermined velocity (determination threshold Td2).

Further, the controller 10 calculates the absolute velocity Va of the object Ob based on the own vehicle velocity Vs which is velocity of the own vehicle Cs and relative velocity Vr of the object Ob with respect to the own vehicle Cs. Specifically, the controller 10 calculates the absolute velocity Va of the object Ob using, for example, the following equation (1).

$$Va = Vr + Vs \quad (1)$$

Note that, in these velocities, a direction inverse to the direction of movement of the own vehicle Cs is expressed as positive.

Returning to description of FIG. 2, the controller 10 determines whether the relative movement state of the object Ob is a "preceding" or "stationary" state (step S13). In the case where the controller 10 determines that the relative movement state of the object Ob is a "preceding" or "stationary" state (YES at step S13), the controller 10 calculates TTC (Time to collision) which is another operation condition for actuating the automatic brake (step S14). The TTC is information for determining a period until the own vehicle Cs collides with the object Ob. The TTC is calculated using the following equation (2) from the relative distance Dr and the relative velocity Vr of the object Ob with respect to the own vehicle Cs, acquired from, for example, the radar sensor 32.

$$TTC = Dr/Vr \quad (2)$$

In the case where the controller 10 determines that the relative movement state of the object Ob is neither a "preceding" nor "stationary" state (NO at step S13), the present processing is terminated. That is, in the determination processing in step S13, if it has been determined that the relative movement state of the object Ob is an "oncoming" state, the present processing is terminated.

The controller 10 detects a timing for actuating the automatic brake based on a result of comparison between the calculated TTC and a threshold TA (step S15). The threshold TA is information of time set in advance for detecting the timing for actuating the automatic brake to avoid the own vehicle Cs from colliding with the object Ob or alleviate damage from a collision. In the case where the controller 10 detects that the TTC is equal to or less than the threshold TA (YES at step S15), the controller 10 sets a brake request flag and actuates the automatic brake (step S16). The brake request flag is control information for controlling the brake unit 25 to cause the ECU 20 to perform collision avoidance processing (automatic brake). In the case where the controller 10 detects that the TTC exceeds the threshold TA (NO at step S15), the present processing is terminated. That is, in the detection processing in step S15, if it has been detected that the TTC is greater than the threshold TA, the automatic brake is not actuated, and the present processing is terminated. In the present embodiment, the processing in step S15 executed by the controller 10 corresponds to a brake detecting unit and a brake detection step of detecting a state where the automatic brake is actuated.

A series of processing illustrated in FIG. 2 is repeatedly executed at a predetermined period. In the case where the operation condition for actuating the automatic brake is changed during execution of this processing, setting of the brake request flag is cancelled. Therefore, in the series of processing illustrated in FIG. 2, if the absolute velocity Va of the object Ob is erroneously detected after the brake request flag has been set, the relative movement state of the object Ob may be erroneously determined, which may cause cancellation of setting of the brake request flag.

Figure 4:
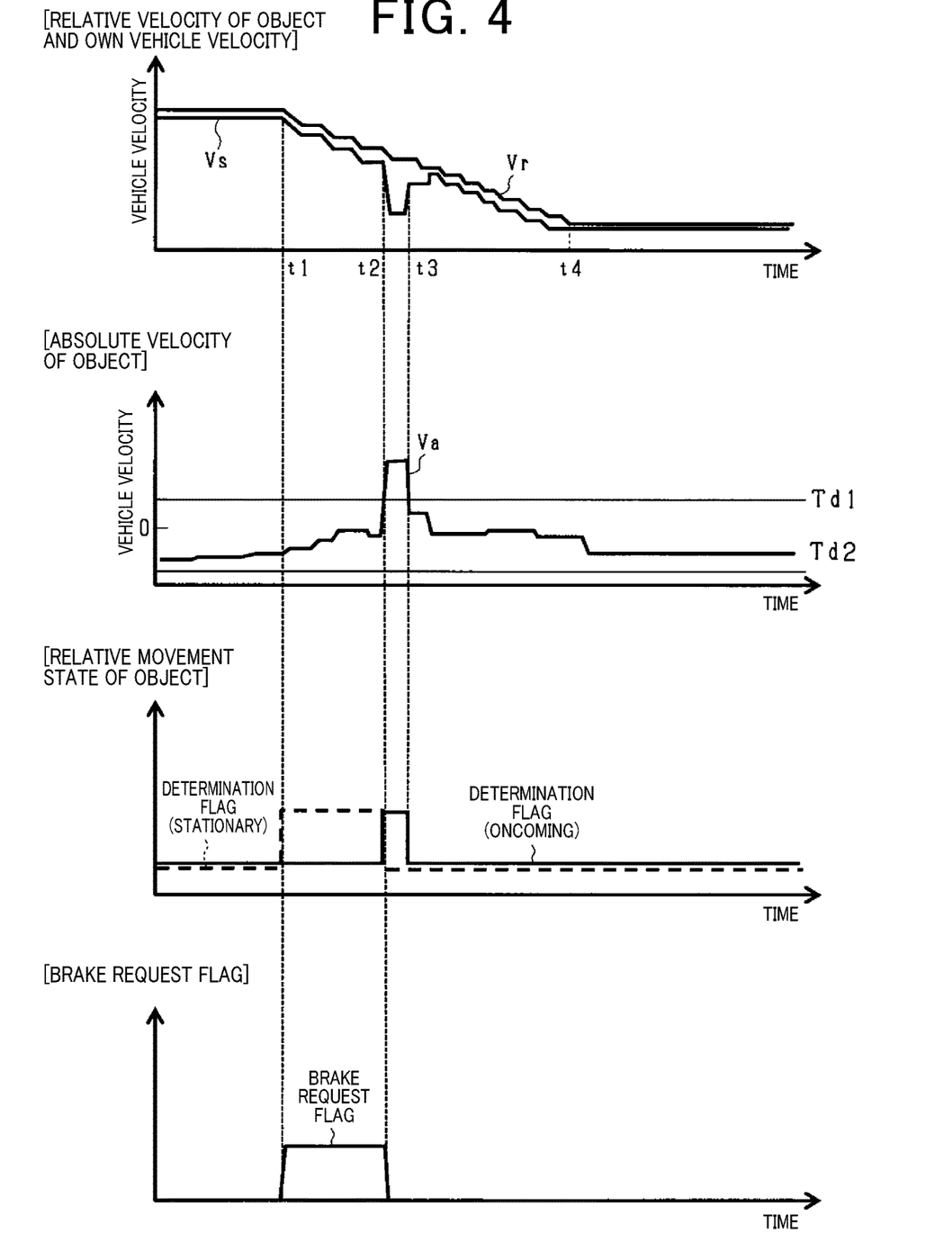
FIG. 4 is a timing chart illustrating operation of determining an operation condition.

FIG. 4 is a timing chart illustrating operation of determining the operation condition. In the present example, it is assumed that the relative movement state of the object Ob is a "stationary" state at time t1, and the TTC is equal to or less than the threshold TA. Therefore, the brake request flag with respect to the ECU 20 is set in the controller 10. Thus, after time t1, the own vehicle velocity Vs decreases by the automatic brake, and the relative velocity Vr of the object Ob decreases due to decrease of the own vehicle velocity Vs.

It is assumed that, in this state, the own vehicle speed Vs is erroneously detected (decrease in velocity) during a period from time t2 to t3. The erroneous detection of the own vehicle velocity Vs occurs in the case where, for example, the wheels are locked by the brake unit 25. As a result, the own vehicle velocity Vs acquired with respect to actual vehicle velocity of the own vehicle Cs changes.

As a result of decrease of the own vehicle velocity Vs, the absolute velocity Va of the object Ob becomes equal to or higher than the determination threshold Td1. Consequently, it is determined that the relative movement state of the object Ob is an "oncoming" state (setting of the determination flag is changed from a stationary state to an oncoming state) although the relative movement state is actually a "stationary" state. That is, the relative movement state of the object Ob is erroneously determined. As a result, at time t2, the controller 10 cancels setting of the brake request flag with respect to the ECU 20. Thus, actuation of the automatic brake by the brake unit 25 is cancelled. In the present example, during a period while the relative movement state of the object Ob is erroneously determined as an "oncoming" state (from time t2 to t3), actuation of the automatic brake is continuously cancelled.

The absolute velocity Va is also erroneously detected due to, for example, delay in following the relative velocity Vr of the object Ob (detection delay) which occurs according to deceleration of the own vehicle velocity Vs. Note that, in the case where the relative movement state of the object Ob changes from an "oncoming" state to a "stationary" state after time t3 (not illustrated), the brake request flag with respect to the ECU 20 is reset. Thus, the automatic brake by the brake unit 25 is actuated.

In the present embodiment, in order to prevent erroneous determination of the relative movement state of the object Ob as illustrated in FIG. 4, the controller 10 changes the determination threshold Td1 after actuation of the automatic brake is started (after the automatic brake is actuated). In the controller 10 of the present embodiment, changing the determination threshold Td1 prevents the relationship between the absolute velocity Va of the object Ob and the determination threshold Td1 from changing when the absolute velocity Va of the object Ob is erroneously detected (in the case where calculation accuracy would otherwise decrease).

Figure 5:
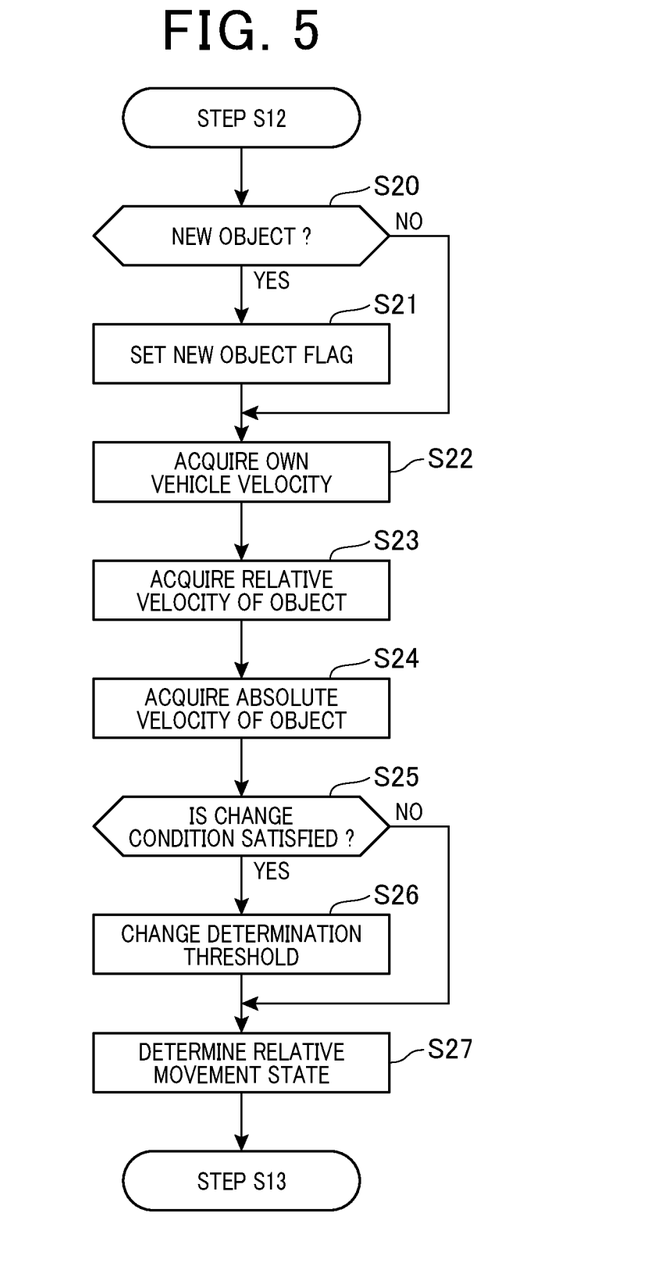
FIG. 5 is a flowchart illustrating processing of determining the operation condition executed in collision avoidance processing in the present embodiment.
Figure 6:
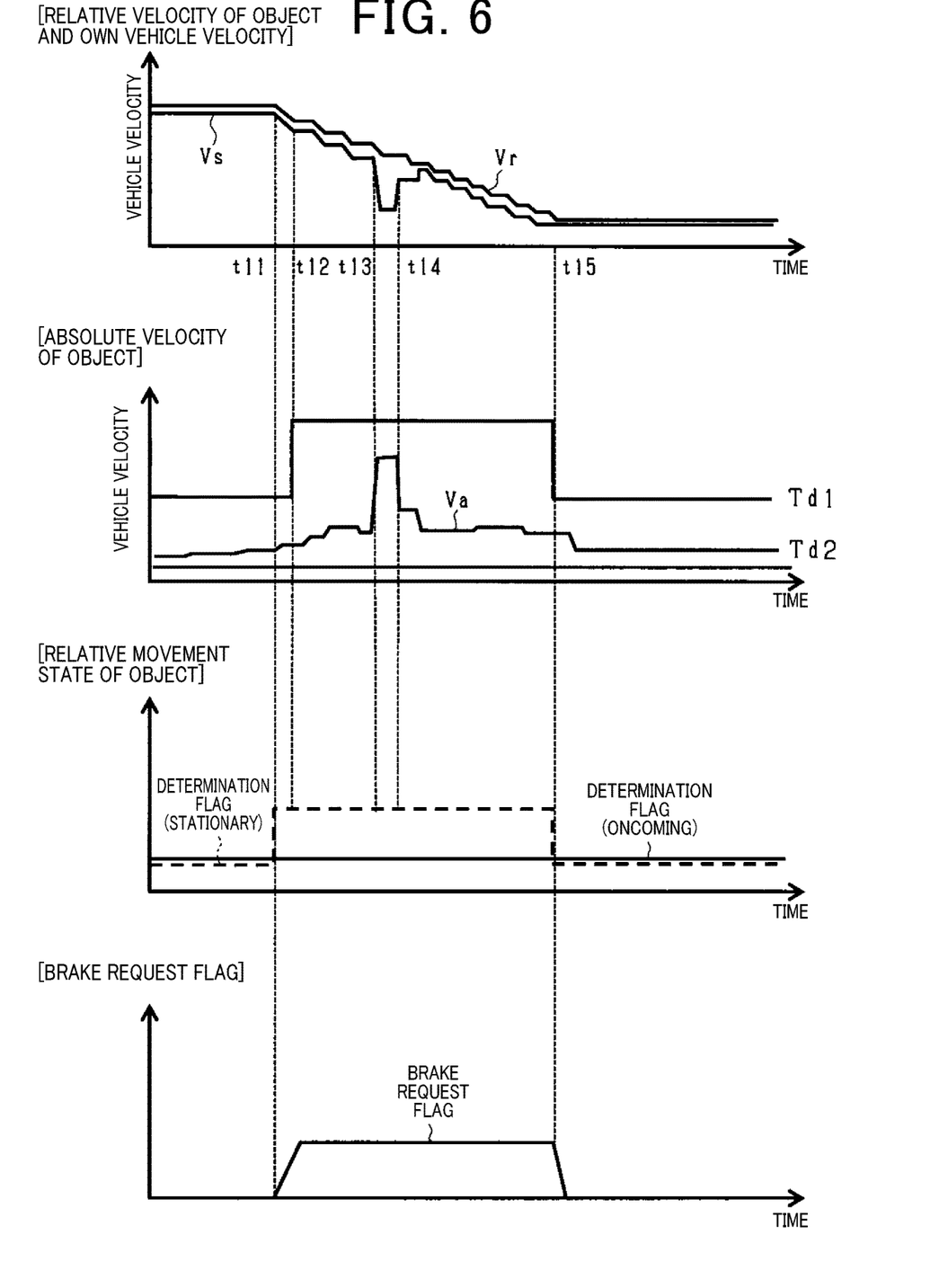
FIG. 6 is a timing chart illustrating operation of determining the operation condition in the present embodiment.

Next, determination of the operation condition for actuating the automatic brake executed by the controller 10 of the present embodiment during the collision avoidance processing will be described. FIG. 5 is a flowchart illustrating the determination processing in step S12 illustrated in FIG. 2. Further, FIG. 6 is a timing chart illustrating operation of determining the operation condition according to the present embodiment.

As illustrated in FIG. 5, the controller 10 determines whether the object Ob detected in step S11 in FIG. 2 is a new object (newly detected object) (step S20). The controller 10 determines whether the object Ob is a new object, for example, as follows. The controller 10 stores a new object flag indicating that the detected object Ob is a new object in a predetermined storage region (such as a RAM). That is, at a new object detected by the previous processing, a corresponding new object flag is set. The controller 10 determines whether an object Ob detected in current processing is a new object based on whether there is setting of the new object flag. If the controller 10 determines that the detected object Ob is a new object because a new object flag is not stored (YES at step S20), the controller 10 sets a new object flag corresponding to the new object detected in the current processing (step S21). If the controller 10 determines that the detected object Ob is not a new object because the new object flag is stored (NO at step S20), the controller 10 does not set anew object flag, and the processing transitions to processing in step S22.

The controller 10 acquires the own vehicle velocity Vs (step S22). The controller 10 calculates the own vehicle velocity Vs which is velocity of the own vehicle Cs based on the output (detection results) from the wheel velocity sensor 34. Specifically, as a method of calculating the own vehicle velocity Vs, the own vehicle velocity Vs may be calculated based on, for example, a value obtained by averaging the numbers of rotations of all wheels of the own vehicle Cs. In the present embodiment, the processing in step S22 executed by the controller 10 corresponds to an own vehicle velocity acquiring unit and an own vehicle velocity acquiring step of acquiring the own vehicle velocity Vs.

The controller 10 acquires the relative velocity Vr of the object Ob with respect to the own vehicle Cs (step S23). The controller 10 calculates the relative velocity Vr of the object Ob based on the output (detection results) from the radar sensor 32. Specifically, as a method of calculating the relative velocity Vr of the object Ob, the relative distance Dr of the object Ob with respect to the own vehicle Cs is acquired based on, for example, the output from the radar sensor 32, and the relative velocity Vr is calculated based on a change amount of the relative distance Dr per unit time. In the present embodiment, the processing in step S23 executed by the controller 10 corresponds to a relative velocity acquiring unit and a relative velocity acquiring step of acquiring the relative velocity Vr of the object with respect to the own vehicle Cs.

The controller 10 acquires the absolute velocity Va of the object Ob (step S24). The controller 10 adds the relative velocity Vr of the object Ob acquired through the processing in step S23 to the own vehicle velocity Vs acquired through the processing in step S22. Thus, the absolute velocity Va of the object Ob is calculated. In the present embodiment, the processing in step S24 executed by the controller 10 corresponds to an object velocity calculating unit and an object velocity calculating step of calculating the absolute velocity Va of the object based on the acquired own vehicle velocity Vs and the acquired relative velocity Vr.

The controller 10 determines whether a change condition for changing the determination threshold Td1 is satisfied (step S25). In the present embodiment, in the case where the following condition is satisfied, it is determined that the change condition is satisfied. Specifically, it is determined that the change condition is satisfied in the case where a new object flag is not set by the current processing and a brake request flag has already been set by the previous processing. That is, in the present embodiment, in the case where the detected object Ob is not a new object and actuation of the automatic brake has already been started, it is determined that the change condition is satisfied. Here, it is assumed that the detected object Ob is determined as a new object, and a new object flag is set by the current processing. In this case, the controller 10 determines that the change condition for changing the determination threshold Td1 is not satisfied (NO at step S25), and the processing proceeds to step S27.

The controller 10 determines the relative movement state of the object Ob based on the absolute velocity Va of the object Ob acquired in step S24 (step S27). The controller 10 determines the relative movement state of the object Ob as one of "oncoming", "stationary" and "preceding" with respect to the own vehicle Cs by comparing the absolute velocity Va of the object Ob with the determination thresholds Td1, Td2. As illustrated in FIG. 6, at time t11, the absolute velocity Va of the object Ob is less than the determination threshold Td1. Therefore, the controller 10 determines that the relative movement state of the object Ob is a "stationary" state (the determination flag is set at a stationary state). In the present embodiment, the processing in step S27 executed by the controller 10 corresponds to a state determining unit and a state determining step of determining the relative movement state of the object in a direction of movement of the own vehicle based on the calculated absolute velocity Va.

As illustrated in FIG. 2, in the case where the controller 10 determines that the relative movement state of the object Ob is a "stationary" or "preceding" state, and the TTC is equal to or less than the threshold TA (YES at steps S13, S15), the controller 10 sets a brake request flag through the processing in step S16. Therefore, at time t11 illustrated in FIG. 6, the relative movement state of the object Ob and the TTC are determined, and the brake request flag is set based on the determination results. Then, in the controller 10, if collision avoidance processing is executed in this state, the processing of determining the operation condition illustrated in FIG. 5 is executed in step S12.

In the processing of determining the operation condition illustrated in FIG. 5, first, it is determined whether the detected object Ob is a new object. Here, description will be provided assuming that the object Ob is detected in the previous processing, and there is no new object detected in the current processing. In a similar manner to the previous processing, the controller 10 acquires the own vehicle velocity Vs, the relative velocity Vr of the object Ob and the absolute velocity Va of the object Ob in steps S22 to S24.

The controller 10 determines whether the change condition for changing the determination threshold Td1 is satisfied in step S25. In the present example, a new object flag is not set in the current processing and a brake request flag is set in the previous processing. That is, in the present example, the detected object Ob is not a new object, and actuation of the automatic brake has already been started. Therefore, in the case where the controller 10 determines that the change condition is satisfied (YES at step S25), the controller 10 changes the determination threshold Td1 (step S26). As illustrated in FIG. 6, for example, at time t12, the controller 10 changes (increase) the determination threshold Td1 to a positive side (in a direction opposite to a direction of movement of the own vehicle). In the present embodiment, the processing in step S26 executed by the controller 10 corresponds to a threshold changing unit and a threshold changing step of changing the threshold Td1 of the absolute velocity Va to be used for determination of the relative movement state by the state determining unit while the automatic brake is actuated.

The controller 10 determines the relative movement state of the object Ob in step S27. In step S26, the determination threshold Td1 is changed (increase) to a positive side. Therefore, in the controller 10 of the present embodiment, if the absolute velocity Va of the object Ob is erroneously detected (particularly, erroneously detected to a positive side), the relative movement state of the object Ob is less likely to be erroneously determined. As illustrated in FIG. 6, for example, during a period from time t13 to t14, the own vehicle velocity Vs is erroneously detected (velocity decreases), and the absolute velocity Va of the object Ob increases due to the erroneous detection. However, in the controller 10 of the present embodiment, the determination threshold Td1 is changed (increase) to a positive side. As a result, the absolute velocity Va of the object Ob becomes less than the determination threshold Td1. Therefore, in the controller 10, the relative movement state of the object Ob is not erroneously determined (it is possible to prevent the state from being determined as an "oncoming" state although the state is actually a "stationary" state).

In this manner, in the present embodiment, in a series of processing after the object Ob is detected, the determination threshold Td1 is repeatedly changed while the automatic brake is continuously actuated. Accordingly, the relative velocity Vr of the object Ob is prevented from being erroneously detected. Note that, in FIG. 6, at time t15, setting of the brake request flag is cancelled, and actuation of the automatic brake is cancelled.

As described above, in the controller 10 (driving support control apparatus) of the present embodiment, if it is determined that the automatic brake of the own vehicle Cs is actuated, the threshold changing unit changes the determination threshold Td1 for the absolute velocity Va used for determination of the relative movement state of the object Ob at the state determining unit. Therefore, in the controller 10, if it is determined that the absolute velocity Va of the object Ob is erroneously detected (in the case where calculation accuracy would otherwise decrease), the relative movement state of the object Ob is less likely to be erroneously determined. As a result, in the controller 10 of the present embodiment, it is possible to appropriately actuate the automatic brake (braking control by driving support), and therefore reliability of the PCS 100 (driving support control) is improved.

The above-described state determining unit determines the relative movement state of the object Ob as a "stationary" state and an "oncoming" state based on the absolute velocity Va of the object Ob. The above-described threshold changing unit changes the determination threshold Td1 if it is determined that the relative movement state of the object Ob is a "stationary" state. In the controller 10 of the present embodiment, according to the above-described configuration, it is possible to prevent the state of the object Ob determined as the "stationary" state from being erroneously determined as an "oncoming" state. As a result, reliability of the PCS 100 (driving support control) is improved.

The above-described threshold changing unit changes the determination threshold Td1 to a value at which the relative movement state of the object Ob is less likely to be determined as an "oncoming" state. In the controller 10 of the present embodiment, according to the above-described configuration, it is possible to reduce a possibility that the state is erroneously determined as an "oncoming" state. Therefore, reliability of the PCS 100 (driving support control) is improved.

The above-described own vehicle velocity acquiring unit acquires the own vehicle velocity Vs based on rotation velocity of the wheels of the own vehicle Cs. If the wheels are locked due to the automatic brake, the own vehicle velocity Vs of the own vehicle Cs is erroneously detected. Even in such a case, in the controller 10 of the present embodiment, according to the above-described configuration, it is possible to prevent the relative movement state of the object Ob from being erroneously determined. As a result, reliability of the PCS 100 (driving support control) is improved.

SECOND EMBODIMENT

Figure 7:
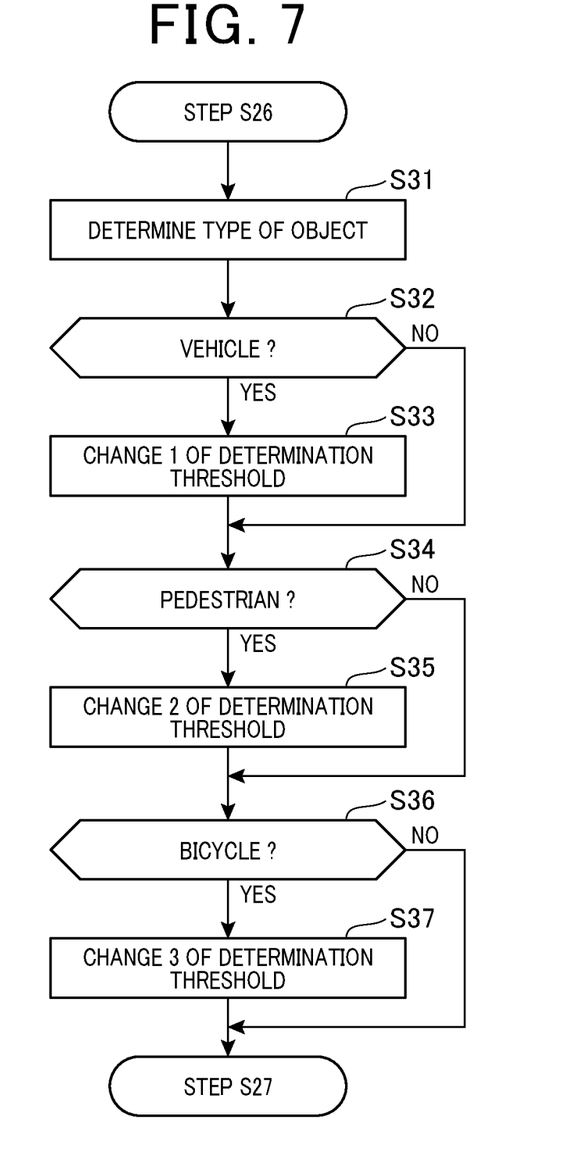
FIG. 7 is a flowchart illustrating processing of changing a determination threshold executed in processing of determining an operation condition in a second embodiment.

In the present embodiment, a configuration is employed where a change amount of the determination threshold Td1 is changed in accordance with a type of the object Ob. Note that, in the following description, only configurations different from those in the first embodiment will be described, the same reference signs will be assigned to the same configurations as those in the first embodiment, and description thereof will be omitted. With reference to FIG. 7, processing of changing the determination threshold executed during the processing of determining the operation condition by the controller 10 of the present embodiment will be described. FIG. 7 is a flowchart illustrating the change processing in step S26 illustrated in FIG. 5. Specifically, the change processing is processing to be executed if the change condition for changing the determination threshold Td1 (the object Ob is not a new object and the automatic brake is being actuated) is satisfied in step S25 illustrated in FIG. 5.

Figure 8:
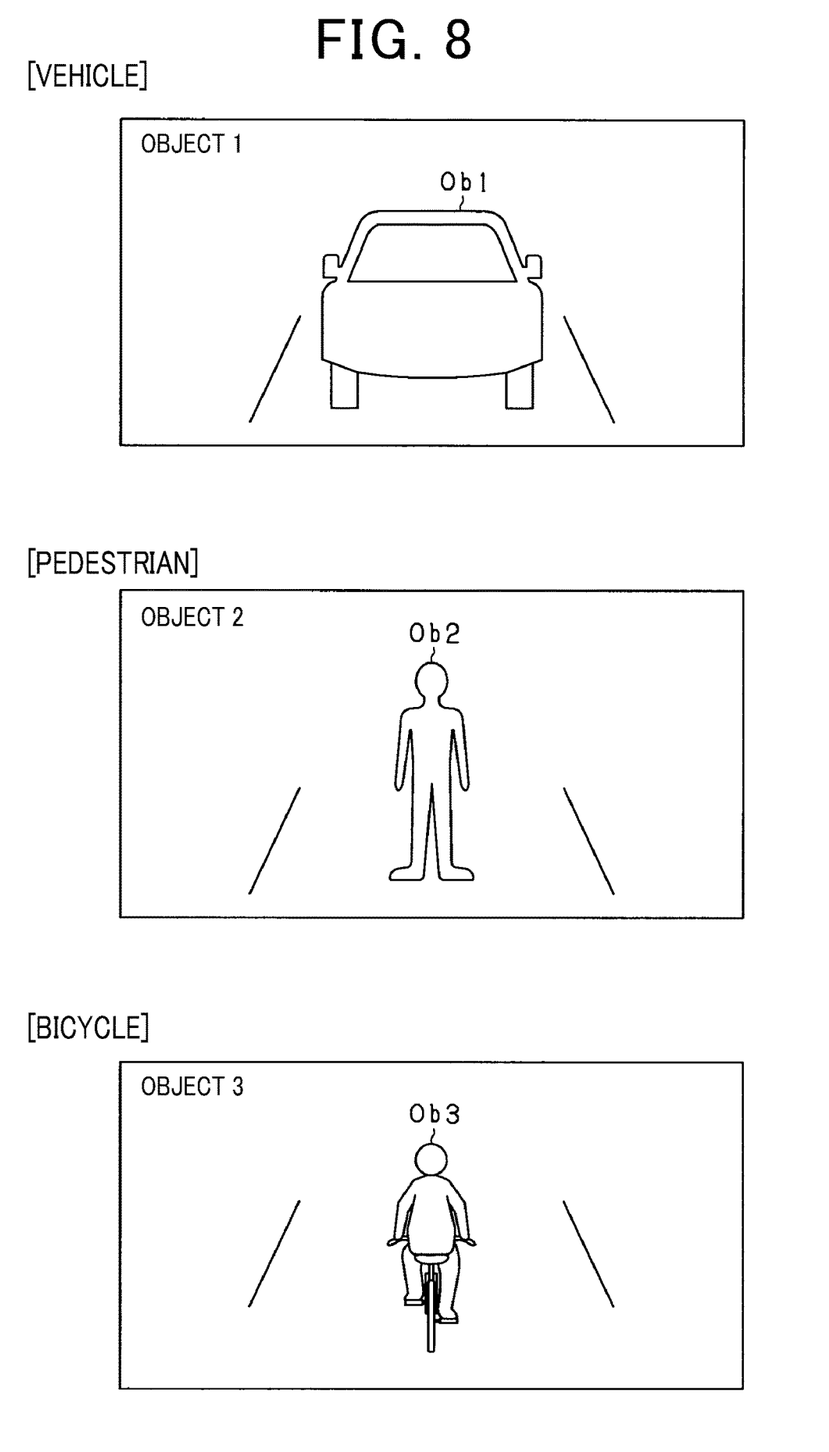
FIG. 8 is a diagram illustrating an example of types of an object.

As illustrated in FIG. 7, the controller 10 determines a type of the object Ob (step S31). FIG. 8 is a diagram illustrating an example of the types of the object Ob. In the present embodiment, for example, as illustrated in FIG. 8, the type of the object Ob is determined as a vehicle Ob1, a pedestrian Ob2, a bicycle Ob3, or the like. The controller 10 determines the type of the object Ob, for example, as follows. The controller 10 determines the type of the object Ob based on a captured image output from the camera sensor 31. Specifically, the controller 10 stores feature amounts of images respectively corresponding to the objects Ob1 to Ob3 in a predetermined storage region (such as a RAM). That is, the feature amounts of the images of the determined objects Ob are acquired and stored in advance. The controller 10 acquires a feature amount of the captured image (performs feature amount detection processing). The controller 10 compares the acquired feature amount with the feature amounts (templates) stored in advance (performs template matching processing). The controller 10 determines the type of the object Ob based on the comparison result.

If the controller 10 determines the type of the object Ob as the "vehicle Ob1" (YES at step S32), the controller 10 performs change 1 of the determination threshold Td1 (step S33). Specifically, the controller 10 changes the determination threshold Td1 based on a predetermined specified range in the case where the object Ob is the vehicle Ob1 (specified range of a threshold for vehicle) (change 1 of the determination threshold). The controller 10, for example, changes (corrects by increasing) the determination threshold Td1 to a positive side (in an opposite direction to the direction of movement of the own vehicle). Note that, in the case where the controller 10 determines that the type of the object Ob is not the "vehicle Ob1" (NO at step S32), the controller 10 does not change the determination threshold Td1, and the processing proceeds to step S34.

If the controller 10 determines the type of the object Ob is the "pedestrian Ob2" (YES at step S34), the controller 10 performs change 2 of the determination threshold Td1 (step S35). Specifically, the controller 10 changes the determination threshold Td1 based on a predetermined specified range in the case where the object Ob is the pedestrian Ob2 (specified range of a threshold for pedestrian) (change 2 of the determination threshold). The determination threshold Td1 after the change processing in step S35 is different from the determination threshold Td1 after the change processing in step S33. That is, the determination threshold Td1 for pedestrians is different from the determination threshold Td1 for vehicles. Note that, if the controller 10 determines that the type of the object Ob is not the "pedestrian Ob2" (NO at step S34), the controller 10 does not change the determination threshold Td1, and the processing proceeds to step S36.

If the controller 10 determines that the type of the object Ob is the "bicycle Ob3" (YES at step S36), the controller 10 performs change 3 of the determination threshold Td1 (step S37). Specifically, the controller 10 changes the determination threshold Td1 based on a predetermined specified range in the case where the object Ob is the bicycle Ob3 (specified range of a threshold for bicycle) (change 3 of the determination threshold). The determination threshold Td1 after the change processing in step S37 is different from the determination threshold Td1 after the change processing in steps S33 and S35. That is, the determination threshold Td1 is different among the threshold for bicycle, the threshold for pedestrian and the threshold for vehicle. Note that, if the controller 10 determines that the type of the object Ob is not the "bicycle Ob3" (NO at step S36), the controller 10 does not change the determination threshold Td1, and the processing is terminated. In the present embodiment, the step S31 executed by the controller 10 corresponds to a type determining unit and a type determining step of determining the type of the object.

Then, the controller 10 executes the determination processing in step S27 illustrated in FIG. 5. The controller 10 determines the relative movement state of the object Ob using the determination threshold Td1 after the change processing illustrated in FIG. 7 in the determination processing in step S27.

As described above, the controller 10 (driving support control apparatus) of the present embodiment includes a type determining unit which determines a type of the object Ob. The threshold changing unit changes the determination threshold Td1 for the absolute velocity Va to be used for determination of the relative movement state of the object Ob at the state determining unit, in accordance with the type of the determined object Ob. In the controller 10 of the present embodiment, according to the above-described configuration, it is possible to change a change amount of the determination threshold Td1 in accordance with the type of the object Ob. Therefore, in the controller 10, if tendency of velocity change, change of a traveling state, or the like, are different for each type of the object Ob, it is possible to prevent the relative movement state of the object Ob from being erroneously determined.

Other Embodiments

While, in the PCS 100 in the above-described embodiments, an example has been described where the controller 10 and the ECU 20 are separately configured, a technique of the present disclosure is not limited to this. As other examples, for example, it is also possible to employ a configuration where one ECU realizes functions of the controller 10 and the ECU 20.

While, in the above-described embodiments, an example where the absolute velocity Va of the object Ob is determined while a direction inverse to the direction of movement of the own vehicle Cs is set as a positive direction, the present disclosure is not limited to this. As other examples, for example, it is also possible to employ a configuration where the absolute velocity Va of the object Ob is determined while the direction of movement of the own vehicle Cs is set as a positive direction. In this case, the determination threshold Td1 is changed to a negative side (in a direction opposite to the direction of movement of the own vehicle) in the change processing in step S26 illustrated in FIG. 5.

While, in the above-described embodiments, an example has been described where the automatic brake is not actuated in the case where the relative movement state of the object Ob is an "oncoming" state, while the automatic brake is actuated in the case where the relative movement state is a "stationary" or "preceding" state, a technique of the present disclosure is not limited to this. As other examples, for example, it is also possible to employ a configuration where the automatic brake is actuated in the case where the relative movement state of the object Ob is an "oncoming" state, while the automatic brake is not actuated in the case where the relative movement state is a "stationary" state. Further, it is also possible to employ a configuration where, for example, determination of a location where the object Ob is present (such as determination as to whether the object Ob is present on a traveling lane) is added to the determination condition for actuating the automatic brake.

While, in the above-described embodiments, an example has been described where three states of "oncoming", "stationary" and "preceding" with respect to the own vehicle Cs are determined as the relative movement state of the object Ob, a technique of the present disclosure is not limited to this. As other examples, for example, it is also possible to employ a configuration where two states of "oncoming" and "stationary" are determined as the relative movement state of the object Ob.

REFERENCE SIGNS LIST

10 . . . Controller
20 . . . ECU
25 . . . Brake unit
30 . . . Sensor
100 . . . PCS (pre-crash safety system)

The invention claimed is:
1. A driving support control apparatus applied to a vehicle system actuating an automatic brake using a brake apparatus based on a predetermined actuation condition, and perform- ing collision avoidance control relative to an object present in front of an own vehicle, the driving support control apparatus comprising:
- an own vehicle velocity acquiring unit configured to acquire an own vehicle velocity;
- a relative velocity acquiring unit configured to acquire relative velocity of the object with respect to the own vehicle;
- an object velocity calculating unit configured to calculate absolute velocity of the object based on the acquired own vehicle velocity and the acquired relative velocity;
- a state determining unit configured to determine a relative movement state of the object in a direction of movement of the own vehicle with respect to the own vehicle by comparing the calculated absolute velocity with a threshold;
- a brake detecting unit configured to detect a state where the automatic brake is actuated; and
- a threshold changing unit configured to change the threshold for the absolute velocity to be used for determination of the relative movement state by the state determining unit, after actuation of the automatic brake is started.

2. The driving support control apparatus according to claim 1,
wherein the state determining unit determines whether the relative movement state is at least a stationary state or an oncoming state based on the absolute velocity, and
the threshold changing unit changes the threshold in a case where the relative movement state is determined as the stationary state.

3. The driving support control apparatus according to claim 2,
wherein the threshold changing unit changes the threshold to a value at which the relative movement state is less likely to be determined as the oncoming state.

4. The driving support control apparatus according to claim 1, further comprising:
a type determining unit configured to determine a type of the object,
wherein the type of object is determined as a vehicle, a pedestrian, or a bicycle, and the threshold changing unit changes the threshold based on the determined type of the object.

5. The driving support control apparatus according to claim 1,
wherein the own vehicle velocity acquiring unit acquires the own vehicle velocity based on rotation velocity of at least one wheel of the own vehicle.

6. The driving support control apparatus according to claim 1, wherein
the threshold changing unit changes the threshold for the absolute velocity to be used for determination of the relative movement state by the state determining unit in a case where an object detected in the current processing is detected in a previous processing and is not a new object and actuation of the automatic brake has already been started.

7. A driving support control method in a driving support control apparatus applied to a vehicle system actuating an automatic brake using a brake apparatus based on a predetermined actuation condition and performing collision avoidance control relative to an object present in front of an own vehicle, the driving support control method comprising:
- an own vehicle velocity acquiring step of acquiring an own vehicle velocity;
- a relative velocity acquiring step of acquiring relative velocity of the object with respect to the own vehicle;
- an object velocity calculating step of calculating absolute velocity of the object based on the acquired own vehicle velocity and the acquired relative velocity;
- a state determining step of determining a relative movement state of the object in a direction of movement of the own vehicle with respect to the own vehicle by comparing the calculated absolute velocity with a threshold;
- a brake detecting step of detecting a state where the automatic brake is actuated; and
- a threshold changing step of changing the threshold for the absolute velocity to be used for determination of the relative movement state in the state determining step, after actuation of the automatic brake is started.

* * * * *